(12) United States Patent
Eipel et al.

(10) Patent No.: US 6,599,755 B1
(45) Date of Patent: Jul. 29, 2003

(54) METHOD AND DEVICE FOR APPLYING SMALL QUANTITIES OF LIQUID

(75) Inventors: Heinz Eipel, Bensheim (DE); Stefan Emig, Ludwigshafen (DE); Siegfried Hauer, Wachenheim (DE); Walter Weishaar, Grünstadt (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/959,379

(22) PCT Filed: Apr. 18, 2000

(86) PCT No.: PCT/EP00/03479
§ 371 (c)(1),
(2), (4) Date: Oct. 24, 2001

(87) PCT Pub. No.: WO00/64584
PCT Pub. Date: Nov. 2, 2000

(30) Foreign Application Priority Data

Apr. 27, 1999 (DE) .......................................... 199 19 135

(51) Int. Cl.[7] .................................................. B01L 3/02
(52) U.S. Cl. ................. 436/180; 73/864.11; 73/864.12; 422/100
(58) Field of Search .......................... 422/100; 436/180; 73/864.11, 864.12

(56) References Cited

U.S. PATENT DOCUMENTS

| | | | | |
|---|---|---|---|---|
| 3,786,683 A | * | 1/1974 | Berman et al. | .......... 73/864.14 |
| 3,888,125 A | * | 6/1975 | Mochida | ................. 73/863.62 |
| 4,130,394 A | * | 12/1978 | Negersmith | ................. 436/179 |
| 4,140,020 A | * | 2/1979 | Cook | ...................... 73/864.12 |
| 4,195,526 A | * | 4/1980 | Amos et al. | ............. 73/864.11 |
| 4,459,267 A | * | 7/1984 | Bunce et al. | ............... 422/100 |
| 5,763,278 A | | 6/1998 | Sickinger et al. | ........... 436/180 |
| 5,947,167 A | * | 9/1999 | Bogen et al. | .................. 141/1 |

FOREIGN PATENT DOCUMENTS

| | | |
|---|---|---|
| DE | 31 13 345 | 10/1985 |
| FR | 2086394 | 12/1971 |
| GB | 916238 | 1/1963 |
| GB | 1 305 783 | 2/1973 |

OTHER PUBLICATIONS

Duggan et al. "Expression profiling usind cDNA microarrays" Nature Genetics Supplement vol. 21 (1999) pp. 10–14.

Schena et al. "Quantative Monitoring of Gene Expression Patterns with a Complementary DNA Microarray" Science vol. 270 pp. 467–470.

* cited by examiner

Primary Examiner—Jan Ludlow
(74) Attorney, Agent, or Firm—Keil & Weinkauf

(57) ABSTRACT

The present invention relates to a method of depositing small amounts of liquid on a substrate (13) by using a pipette tip (1), which is connected to a flexible delivery line (2). Liquid is taken up by expanding the volume in the delivery line (2), and liquid is ejected by exposing the line to an impulse that is transmitted to the liquid contained in it.

15 Claims, 1 Drawing Sheet

METHOD AND DEVICE FOR APPLYING SMALL QUANTITIES OF LIQUID

The present invention relates to methods and to a device for depositing small amounts of liquid, for example for parallel analysis when comparing DNA sequences.

In the prior art, articles by Shena et al. (Science 270, 467–470, 1995) and by Cheny et al. (Nature Genetics Supplement 21, pp. 15–19, 1999) have described ways of depositing a hybridization microarray of on surfaces for a plurality of concurrent analysis operations running in parallel.

Small amounts of liquid have hitherto being deposited using one of the methods described briefly below. In the "fountain pen" method, for example, spots of the liquid are applied to the surfaces by using a tool analogous to an ink pen. A disadvantage of this procedure that the amount of liquid deposited using this method depends very much on the surface tensions of the liquid both with respect to the tool and with respect to the surface. It is therefore difficult to control the amounts of liquid that are to be deposited. In general, although the wetting action of the liquid to be deposited is known, the interaction of the liquid with the tool and the surface has a non-negligible effect on the amount of liquid that finally adheres to the surface.

Another method of depositing liquids uses a very rapid-acting valve which briefly opens then re-closes a pressurized line in order to deposit a drop of liquid on a surface. It is, however, difficult to use this method for generating very high-density analysis arrays; the technical requirements for the rapid-acting valve that opens and re-closes the pressure line are exceptionally great, especially when the amount of liquid that is delivered needs to be controlled very accurately.

In the case of inkjet printers, it is common practice to use piezoelectric actuators. Although these can deliver very small amounts of liquid with a very high degree of accuracy, the procedure is technically very elaborate. Pipette tips with integrated piezoelectric actuators are extremely expensive and exceptionally fragile.

The disadvantage with the "fountain pen" method briefly described above is the very large degree of fluctuation in the amounts of liquid deposited by means of this method. The essential disadvantage of the methods that use an extremely rapid-acting valve and the last method, which uses piezoelectric elements, is that a motorized dosing tip is needed for taking up the liquid to be pipetted. The technical complexity involved with this is exceptionally high, and a further problem is that the volume in the tube connection between the dosing tip and the pipetting head changes with temperature and as the tube moves.

On the basis of the prior art briefly described above, it is an object of the invention to reduce significantly the equipment outlay for a method of pipetting small amounts of liquid and to control accurately the amounts of liquid to be deposited by using the pipetting method, as well as to ensure that a high coverage density can be created on a substrate.

According to the invention, this object is achieved by the fact that, in a method of depositing small amounts of liquid on a substrate by using a pipette tip, which is connected to a flexible delivery line, liquid is taken up by expanding the volume in the delivery line and drops of liquid are deposited by exposing the line to an impulse that is transmitted to the liquid contained in it.

According to a device, which corresponds to the method of the invention, for depositing small amounts of liquid on a substrate by using a capillary, which is connected to a flexible delivery line, the flexible delivery line is provided with independently operated instruments for controlling its cross section, a hammer being provided for exerting an impulse on said line, and the hammer's operating distance for changing the volume in the delivery line can be altered.

Many advantages can be achieved with the solution according to the invention. The invention allows accurately controllable, extremely small amounts of liquid to be deposited reproducibly and expediently on substrates and surfaces, without resorting to an expensive and mechanically very fragile piezoelectric pipette tip. The simple and economical pipetting head is easy to replace when necessary; after liquid has been taken up, a plurality of impulses can be transmitted to the delivery line so that a plurality of liquid drops can be deposited precisely in quick succession.

According to further refinements of the method of the invention, the instruments for controlling the cross section of the resilient delivery line are designed as compression valves which, for example, can be operated by electromagnetic means. One of these compression valves is closed while liquid is being taken up and is only opened to rinse the delivery line, whereas the other compression valve is opened to take up liquid so that the internal volume of the resilient delivery line is increased and liquid from a container can be taken up in it. In order to be dipped into the container, the pipette tip and the flexible delivery line may be held on a rail that can be moved up and down, allowing the pipette tip to be moved into the container or onto the substrate. The rail may be moved pneumatically, electromagnetically or using an electric motor.

The amount of liquid to be taken up may be metered by providing a variable stop on the cross-sectional control instrument that causes this dose to be taken up, the stop being used to vary the operating distance with which liquid is taken up. The amounts of liquid to be deposited are in the range of from 100 pl to 1 $\mu$l, preferably in the range of from 500 pl to 10 nl, for which highly accurate and reproducible control of the drop size is absolutely necessary.

While the small amount of liquid is being deposited on the substrate, the flexible delivery line is closed at one end by a cross-sectional control instrument and an actuable hammer element, for example, is used to apply impulses to this line. The hammer may be operated electromagnetically or pneumatically, or actuation may be carried out mechanically using a spring with calibration by an electromagnet. In the region where the impulse is transmitted, the flexible delivery line, which is held inside a bore passing through a mount, is compressed by the impulse from the hammer to the extent of the latter's preset operating distance and emits a liquid drop, the size of which depends on the change in volume due to the impulse, through the pipette tip onto the substrate. By means of a variable stop, which can be displaced by using adjustment means, it is possible to adjust the volume change which the impulse causes in the flexible delivery line.

After impulses that can be exerted have emptied the flexible delivery line, the compression valves can be opened so that a pressurized rinsing liquid can be fed through the flexible delivery line to the pipette tip in order to clean it. The pipetting head is subsequently moved to a washing position and then the rinsing medium is discharged.

The glass capillary having a very small outlet aperture, which can be used as the pipette tip, may be produced by heating one end of the capillary while using a pierced metal plate as a heat shield. The capillary is rotated while heating, so that its temperature can be increased uniformly until it softens. The surface tension of the glass causes the aperture of the capillary to contract during this procedure. The glass capillary may be coated fully or partially with a silane, for example, in order to obtain a specific surface tension.

The method according to the invention and the associated device will be described in more detail with the aid of the drawing, in which:

FIG. 1 shows a device according to the invention for depositing small amounts of liquid.

Figure 1:
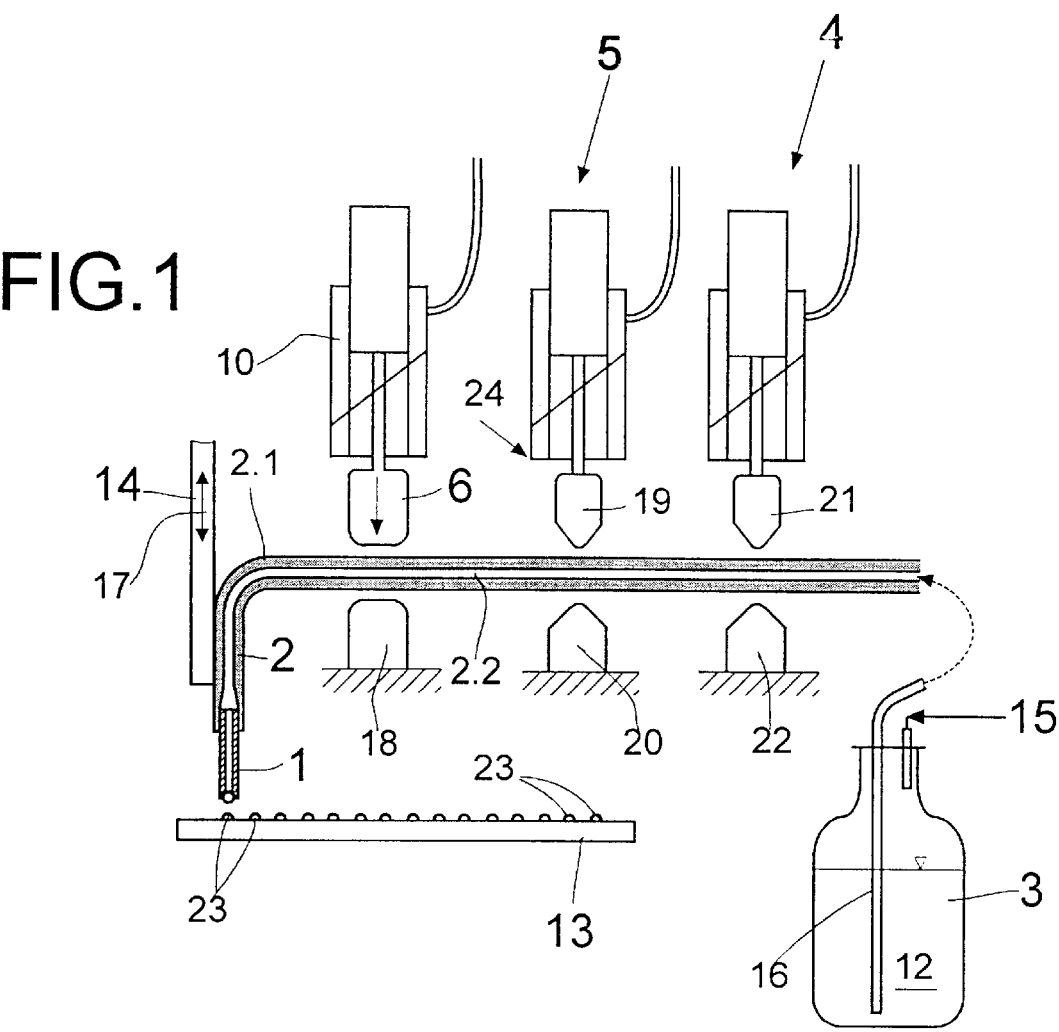
FIG. 1 shows a side view of a device according to the invention for depositing small amounts of liquid.

A pipette tip 1, which is in the form of a glass capillary, is fitted into an open end of a flexible delivery line 2, for example in the form of an resilient tube. The other end of the flexible delivery line 2 may optionally be connected to a pressurized vessel 3 containing a rinsing liquid, which has a suction pipe 16 extending into it, through which the rinsing medium can be fed (as shown by the broken arrow) into the flexible delivery line 2 when the latter needs to be cleaned. To that end, the pipette tip 1 is moved to a washing position where the rinsing medium is discharged from the flexible delivery line 2 before liquid is taken up into it.

An example of a mechanism for taking up liquid, which will be deposited on the substrate 13 as liquid drops 23 for pipetting in extremely small doses, will now be described. A first compression valve 4 is closed and constricts the cross section 2.2 of the flexible delivery line 2 between a compression cone 21 and a backing support 22 located opposite, thereby closing the delivery line 2. The second compression valve 5, which was originally constricting the delivery line 2, is now opened while the capillary 1 is dipped into a container (not shown in further detail here). As the compression cone 19 retracts from the backing support 20 located opposite, the flexible delivery line 2, which may be in the form of an elastic capillary tube, experiences an increase in its internal volume so that liquid can be taken up. A variable stop 24 assigned to the compression valve 5 can be used to adjust the amount of liquid that is to be taken up and held in the flexible delivery line 2.

After the liquid has been taken up—the flexible delivery line 2 now contains a supply of it—the flexible delivery line 2, together with the pipette tip 1 fitted to it, is taken out of the container and brought into the position above a substrate 13 as shown in FIG. 1, by moving the rail 14 as shown by the double arrow 17. The rail 14 that holds the delivery line 2, together with the pipette tip 1, may be moved pneumatically, using an electric motor or electromagnetically.

The flexible delivery line 2 consists of an elastic deformable material having a wall 2.1, which encloses a cross section 2.2 that now contains a previously set amount of liquid taken from the container. In FIG. 1, a hammer 6 is arranged between the rail 14 and the compression valve 5. In the exemplary embodiment that is shown, the hammer 6 can be operated electromagnetically, although pneumatic, hydraulic or spring-calibrated operation is also conceivable. Accordingly, when an impulse is transmitted to the flexible delivery line 2 by using the percussion element 6—the first compression valve 4 is closed—an impulse is exerted on the supply of liquid contained inside this line 2, and a drop of liquid 23 can be deposited on the surface of the substrate 13 through the pipette tip 1. Depending on the amount of liquid stored in the delivery line 2, a large number of liquid drops 23 can be deposited on the substrate surface 13 by exerting a plurality of impulses on the line 2, until the supply of liquid contained in the delivery line 2 has been used up.

Figure 2:
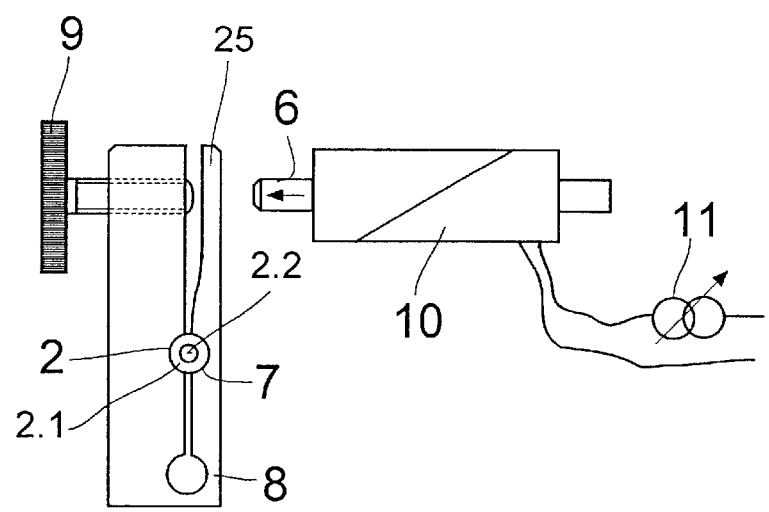
FIG. 2 shows a view of an instrument for controlling the cross section of a flexible delivery line.

Concerning the way of controlling the small amount of liquid, which reaches the surface of the substrate 13 in the form of successively deposited liquid drops 23, reference will be made to the representation in FIG. 2, which shows a view of an instrument for controlling the cross section of a flexible delivery line.

The impulse on the flexible delivery line 2 may be set, for example, by means of a variable stop 25 shown in this representation. A bore 7 that encloses the flexible delivery line 2 is made in a mount 8. A slotted aperture, which widens in the upward direction and separates the variable stop 25 from the body of the mount 8, is made in this mount 8. The hammer head 6 of an instrument 10 that transmits the impulse to the delivery line 2 is located opposite the variable stop 25. This instrument may, for example, be in the form of an electromagnet whose operating current can be set in a favorable range by a control instrument 11. For example, the impulse repetition rate may also be set by using the control instrument 11. The mount 8 furthermore contains a setting screw 9, which defines the operating distance of the variable stop 25 that can be operated by the hammer head 6 and thereby limits the deformation and the volume change of the cross section 2.2 of the delivery line 2. In this way, it is possible to control the size of liquid drops 23 extremely accurately; in the exemplary embodiment, the amount of liquid can be controlled between 100 pl and 1 $\mu$l, or between 500 pl and 10 nl, depending on the situation. This procedure is an extremely simple way of reproducibly controlling extremely small amounts of liquid and depositing them expediently on the surface of a substrate 13. Technically elaborate piezoelectric pipetting heads are unnecessary and the coverage density is now limited merely in terms of the substrate movement increment and the diameter of the capillaries and the tubes, and it can be set in a wide range.

The pipette tip 1 is exceptionally easy to produce as a glass capillary, and can be inserted very readily into an open end of the delivery line 2. The glass capillary 1 is therefore easy to replace, so that the pipetting device can be rapidly refitted and quickly provided with larger-diameter pipette tips 1 when somewhat larger amounts of liquid are to be deposited on a substrate 13. The pipette tip 1 can be produced easily by heating a glass capillary, for example using a gas flame or another heat source. A suitable heat shield, in the form of a pierced metal plate, may be used to limit the supply of heat just to the outermost end of the capillary 1. The end of the glass capillary 1 is preferably rotated while heating, so as to ensure a uniform distribution of heat. A video camera may very advantageously be used to measure the aperture diameter of the glass capillaries during the production process.

Lastly, a specific surface tension may be obtained by coating the glass capillary 1 with a material that suitably modifies the surface tension, for example a silane. This coating of the capillary 1 with a suitable silane may be carried out over the entire surface that comes into contact with the liquid, or over only part of it, for example only over the outer surface of the capillary.

Besides electromagnetic initiation of an impulse from the hammer 6, it is likewise conceivable to initiate an impulse by using a calibrated spring. The spring may in turn be calibrated by a magnet, and may be triggered according to the ejection frequency of the liquid drops 23 to be deposited. Besides the drive modes already listed, it is also conceivable to use an electric-motor drive for moving the rail 14 in the vertical direction 17, and the same applies to the incremental movement of the substrate 13 relative to the static pipette tip 1, which can be moved up and down, or for the pipette tip 1 relative to a substrate 13 which is static. By changing the movement increments of the pipette tip 1 relative to the substrate 13, and vice versa, the density at which the substrate surface 13 is covered with liquid drops 23 can be set accurately, so that it is possible to perform parallel analysis for comparing DNA sequences or protein binding analysis. The proposed method and the proposed device can equally well be used to carry out catalyst optimization.

It is, of course, also possible to connect together a plurality of pipetting systems according to FIG. 1, in order to provide larger areas of substrate with a constant array density but using drops of different liquids. Each of these pipetting systems may access a container individually assigned to it, so that each of them can deliver a specific liquid to be deposited for analysis.

List of Parts
1 capillary
2 delivery line
2.1 wall
2.2 cross section
3 vessel containing rinsing liquid
4 tube compression valve
5 second compression valve
6 hammer
7 bore
8 mount
9 setting screw
10 electromagnet
11 operating current
12 rinsing medium
13 substrate
14 rail
15 connector for pressure feed
16 pipe
17 approach direction
18 anvil for hammer 6
19 compression cone
20 backing support
21 compression cone
22 backing support
23 liquid drops
24 variable stop for taking up liquid
25 variable stop on mount 8

We claim:

1. A method of depositing small amounts of liquid onto a substrate (13), which comprises taking up said liquid through a pipette tip (1) which is connected to a flexible delivery line (2) by expanding said delivery line (2) and ejecting small amounts of liquid by exposing said delivery line to an impulse that is transmitted to said liquid contained in said delivery line, wherein the delivery line (2) is provided with at least a first and a second cross-sectional control instrument (4, 5), which close the delivery line (2) while the delivery line (2) is connected to a container of said liquid, and said taking up of said liquid is carried out by opening said second cross-sectional control instrument (5) to cause said expanding of the stored volume in said delivery line.

2. A method as claimed in claim 1, wherein the instruments (4, 5) are designed as compression valves.

3. A method as claimed in claim 1, wherein liquid is taken up by dipping the pipette tip (1) into said container.

4. A method as claimed in claim 3, wherein a rail (14) that holds the pipette tip (1) can be moved in an approach direction (17).

5. A method as claimed in claim 4, wherein the rail (14) is moved pneumatically, electromagnetically or using an electric motor.

6. A method as claimed in claim 1, wherein the amount of liquid to be taken up is metered by providing a variable stop (24) on the cross-sectional control instrument (5), which is opened to take up the liquid.

7. A method as claimed in claim 1, wherein the amount of liquid to be deposited is in the range of from 100 pl to 1 $\mu$l.

8. A method as claimed in claim 7, wherein the amount of liquid to be deposited is in the range of from 500 pl to 10 nl.

9. A method as claimed in claim 1, wherein the delivery line (2) is closed by a cross-sectional control instrument (4) while the small amount of liquid is being deposited.

10. A method as claimed in claim 1, wherein the impulse that is transmitted to the liquid contained in the delivery line (2) is generated by means of an electromagnetically or pneumatically operated hammer (6).

11. A method as claimed in claim 1, wherein the impulse can be transmitted to the delivery line (2) using a variable stop (25) whose operating distance can be altered.

12. A method as claimed in claim 11, wherein the operating distance that determines the volume of the liquid drop (23) can be changed by using a control means (9).

13. The method of claim 1 wherein after said depositing of said small amounts of liquid on said substrate, said cross-sectional control instruments are opened and a pressurized rinsing liquid (3) is fed through said flexible delivery line to said pipette tip to clean it.

14. The method of claim 1 wherein the density at which the substrate surface 13 is covered with liquid drops is set so that it is possible to perform parallel analysis for comparing DNA sequences or protein binding analysis.

15. A device for depositing small amounts of liquid on a substrate (13) which comprises a capillary (1), which is connected to a flexible delivery line (2), wherein the flexible delivery line (2) is provided with two independently operated instruments (4, 5) for controlling its cross section and a hammer (6) is provided for applying an impulse to the delivery line (2), and the hammer's operating distance for changing the volume in the delivery line (2) can be altered.

* * * * *

UNITED STATES PATENT AND TRADEMARK OFFICE
CERTIFICATE OF CORRECTION

PATENT NO.    : 6,599,755 B1
DATED         : July 29, 2003
INVENTOR(S)   : Eipel et al.

It is certified that error appears in the above-identified patent and that said Letters Patent is hereby corrected as shown below:

<u>Title page,</u>
Item [86], "PCT/EP00/03479" should be -- PCT/EP 00/03497 --.

Signed and Sealed this

Eleventh Day of November, 2003

JAMES E. ROGAN
*Director of the United States Patent and Trademark Office*